April 15, 1969      T. T. LUNDE      3,438,681
METHOD AND APPARATUS FOR HANDLING PARTICULATE MATTER
Filed Nov. 15, 1966
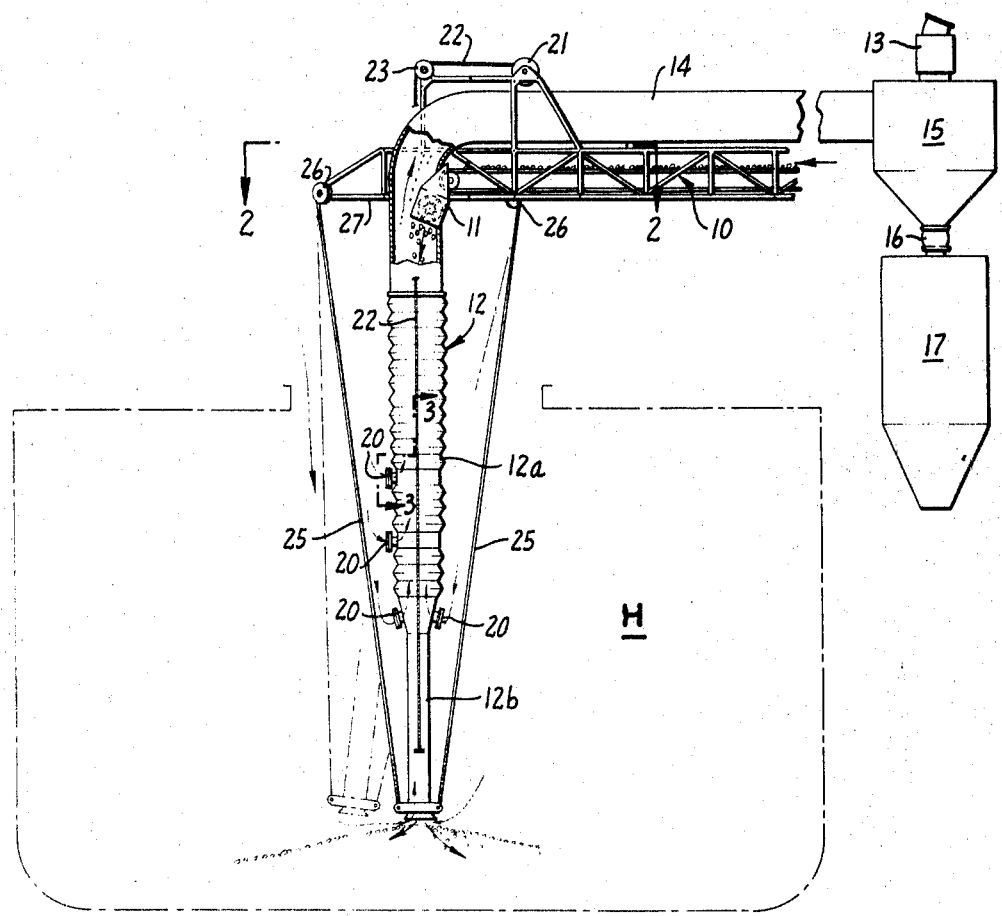
FIG. 1.
FIG. 2.
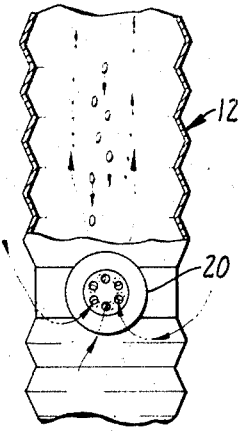
FIG. 3.
INVENTOR.
THOMAS T. LUNDE
BY Hoppe, Mitchell, Murtha and Anderson
ATTORNEYS

# United States Patent Office 3,438,681
Patented Apr. 15, 1969

3,438,681
METHOD AND APPARATUS FOR HANDLING PARTICULATE MATTER
Thomas T. Lunde, 6 Locksley Ave.,
San Francisco, Calif. 94122
Filed Nov. 15, 1966, Ser. No. 594,436
Int. Cl. B65g 53/08, 53/58
U.S. Cl. 302—17                                        8 Claims

ABSTRACT OF THE DISCLOSURE

Methods and apparatus for impeding the fall of particulate matter to control the granular size and impact velocity of such matter as it is deposited into a compartment; methods and apparatus that have particular utility in loading particulate matter into the hold of a ship to avoid the hazards of explosion and fire.

---

This invention relates to methods and apparatus for handling particulate matter and, more particularly, to a method and apparatus for controlling the impact velocity of particulate matter and removing fines therefrom while such matter is deposited into a bulk storage compartment. The methods and apparatus herein contemplated are especially useful in loading ships.

In brief, the invention comprises methods and apparatus for generating a moving air stream in opposition to the gravitational fall of particulate matter and regulating the velocity of the air stream to control the size and impact velocity of the particulate matter deposited. The velocity of the air stream is regulated by confining the air stream and fall of particulate matter in a vertical passage, the air stream being created by applying a subatmospheric pressure to the upper end of the passage while introducing air into the pasage at predetermined points along the path of gravitational fall.

The apparatus found to be most useful in practicing the invention essentially comprises a feed conduit having an extendible section, suction means for applying subatmospheric pressure to the upper end of the conduit, and means for adjusting the length of the conduit and supporting its lower end at various positions relative to the storage compartment into which particulate matter is deposited. A plurality of air intake regulators are provided along the length of the extendible conduit to control the velocity and force of air within. In addition, the conduit is preferably formed with a downward taper to aid in controlling air velocities within the conduit, and the extendible section of the conduit may be formed with an accordian pleat to allow the lower end of the conduit to be transversely moved and positioned above a wide area of flooring while the upper end remains relatively fixed.

The present invention is directed to the problem and difficulty associated with loading particulate matter into the hold of a ship. For example, it is commonly known that the impact and abrasion between iron pellets loaded in a ship carrier by gravity causes a fracturing of pellets and an increase in the percentage of fines. This fact is economically important since penalties may be assessed against the carrier if the percentage of fines is too great. Moreover, the fracturing of pellets often produces a dust cloud that presents the hazards of fire and explosion. Although the idea of using an upwardly directed air stream in a delivery chute to remove dust from particles is old, the concept of regulating the velocity of the air stream to conrtol the velocity of impact and the size of particulate matter deposited is believed to be novel and of significant value in solving these problems.

In view of the above brief description, it will be apparent that a principal object of the present invention is to provide methods and apparatus for loading grain and other particulate matter into a compartment, such as the hold of a ship, while simultaneously removing fines, inhibiting the fracture of the matter being loaded and controlling the size of the particles deposited.

A still further object is to provide apparatus capable of carrying out the above object and also capable of being quickly and easily adjusted for variations in the length of gravitational fall of the particulate matter. Such adjustments are necessary to accommodate the settling of a vessel into the water as a result of the mass of material deposited into a hold as well as the piling up of the material in the hold.

An additional object of the invention is to provide methods and apparatus for loading particulate matter into the hold of a ship while avoiding the hazards of explosion and fire which normally exist during conventional loading.

Other objects of this invention will become apparent in view of the following detailed description and the accompanying drawings.

In the drawings forming a part of this application, and in which like parts are identified by like reference numerals throughout the same.

FIG. 1 is a substantially side elevation of a preferred form of the invention in apparatus comprising a feed conduit and conveyor for delivering particulate matter into the hold of a ship;

FIG. 2 is a partial cross section and top plan view of the feed conduit and conveyor taken on lines 2—2 of FIG. 1; and FIG. 3 is an enlarged elevation and detail view of a portion of the feed conduit, taken on the broken lines 3—3 of FIG. 1.

Referring to FIG. 1 in particular, the illustrated embodiment of the invention comprises a belt conveyor 10, a motor-driven rotary vane valve 11 and an extendible feed 12. Conveyor 10 is used for transporting particulate matter from a source (not shown) to a point of discharge above the hold H of a ship. Rotary vane valve 11 receives particulate matter from the belt conveyor and then introduces the matter through an air seal into conduit 12.

An air stream is generated in opposition to the gravitational fall of particulate matter through conduit 12 by means of a blower 13 applied to a suction line 14 connected to the upper end of conduit 12. A cyclone chamber 15 is provided on the upstream side of blower 13 to remove dust and other fine pieces of particulate matter picked up and carried in the air stream. The particles which are separated out in cyclone 15 may then be discharged through a valve 16 into a dust collecting hopper 17.

One of the more important features of the apparatus shown is the tapered, accordian-pleated section 12a of feed conduit 12. The accordian pleats of this section permit the length of the conduit to be adjusted for positioning the lower end of the conduit adjacent, but above, the bottom of the hold or the pile of particulate matter deposited in the hold. In addition, the accordian pleats inherently provide flexibility to the conduit, allowing its lower end to be moved horizontally for directing the particulate matter into remote region of the hold.

Section 12a of the feed conduit is tapered downward to increase the velocity of the air stream (and the resistance to falling particles) in the lower end of the conduit. If the only air entering conduit 12 is that which enters its lower end, then the maximum air flow velocity would occur in the narrowest section of the conduit. However, air intake regulators 20 are provided along the length of the conduit to admit additional air and dust particles into the conduit. By selectively opening or closing these regulators, one may adjust the velocity of the air stream at various points along the conduit to control the size of particulate matter that is deposited.

Maintaining a subatmospheric pressure in hold H and an atmospheric pressure above the deck will produce an air movement into the hold, rather than the reverse. Accordingly, regulators 20 are preferably located only along sections of conduit 12 which remain below the deck of hold H. If openings are also provided above the deck, then it is possible that some dust particles might be sucked from the hold.

It is contemplated that the lowermost end of conduit 12 should be provided with a section 12b of fixed length in which the velocity may be kept at a relatively high level irrespective of the overall length of the conduit. The maximum braking force of the moving air stream is applied in this section and that force may be regulated simply by opening or closing regulators 20. This operation may be carried out with electric or pneumatic controls operated by one or more switches located above deck.

The lower end of conduit 12, and more particularly section 12b, is adapted to be raised and lowered depending on the depth of the hold H and the height of particulate matter deposited in the hold. The raising and lowering of section 12b is accomplished with a hoist 21 and a pair of wire ropes 22 entrained over sheave pulleys 23. As indicated above, it is also contemplated that the lower end of conduit 12 may be moved horizontally within hold H. The apparatus provided for this purpose comprises a rigging of wire ropes 25 entrained over sheaves 26 supported on a framework 27. The lower end of each rope 25 is attached to section 12b, while the upper end is connected to a winch drive, not shown. The operation of the winch drive may be controlled manually by push button and/or proximity switches secured to the end of feed conduit section 12b.

In operation, conveyor 10 transports particulate matter from a supply source to the rotary vane valve 11, which is synchronously driven with the conveyor and preferably oversized so that its vane pockets are only 80% filled at maximum conveyor capacity. The rotary vane valve transfers the particulate matter through an air seal into the subatmospheric interior of conduit 12. As the particles of matter gravitate through the conduit, they do so against the force of the upward moving air stream. The air stream velocity is inherently regulated by the taper of the conduit in section 12a and is more particularly controlled by opening or closing regulators 20. In this manner, the velocity of the particulate matter at the time it is deposited into the hold may be carefully controlled to reduce impact forces and avoid fracturing of material deposited in the hold.

It is to be understood that the capacity of blower 13 is designed to furnish optimum velocities in feed conduit 12 as to handle the largest pellet size contemplated. The design requirements of blower 13 must also be considered in light of a given maximum free fall distance. These design considerations are based on common engineering formula known to engineers, but the blower size for any given system may also be determined by empirical methods.

Although a preferred form of the invention has been illustrated and described, it will be apparent that various modifications and changes may be made without departing from the spirit of the invention or the scope of the appended claims, and each of such changes is contemplated.

Having thus described my invention, what I claim and desire to secure by Letters Patent is:

1. A method for removing fines from particulate matter while controlling the granular size and impact velocity of such matter being gravitationally deposited in a storage compartment, comprising; introducing particulate matter into a passage for gravitational fall through an open lower end thereof into a storage compartment, generating an air stream extending upwardly from said open lower end in opposition to the gravitational fall of said particulate matter, steps for controlling the pressure differential between the upper and lower ends of said passage for substantially impeding the impact velocity of the coarser particles of particulate matter with the floor of the compartment and that particulate matter previously deposited in said storage container to substantially limit the attrition of said coarser particles, said steps including applying a subatmospheric pressure to the upper end of said passage, controlling the introduction of air at a plurality of vertically spaced points along the path of gravitational fall, and raising the lower end of the passage while maintaining a controlled pressure differential as particulate matter piles up in the compartment.

2. Apparatus for removing fines from particulate matter and depositing said matter into a storage compartment, such as the hold of a ship, with controlled velocity comprising: a conduit for gravitationally feeding particulate matter into a storage compartment, said conduit having an extendible section; means for applying a controlled pressure differential between the upper and lower ends of said conduit; means for adjusting the length of said extendible section to support the lower end of said conduit at various elevations relative to the bottom of a compartment while maintaining a controlled pressure differential; and means for depositing particulate matter into said conduit at a controlled rate.

3. The apparatus of claim 2, said extendible section being downwardly tapered.

4. The apparatus of claim 2, said extendible section being accordian-pleated.

5. The apparatus of claim 2 and further comprising a plurality of air intake regulators spaced along said conduit and in fluid communication with the interior thereof.

6. The apparatus of claim 2, said conduit further comprising a non-extendible section of substantially uniform cross section mounted to the lower end of said extendible section.

7. The apparatus of claim 2 and further wherein the inner surface of said conduit defines a restricted passage having a smaller cross sectional area near the lower end as compared with cross sectional areas near the upper end.

8. The apparatus of claim 2 and further comprising means for maintaining a subatmospheric pressure in the compartment into which particulate matter is deposited.

References Cited

UNITED STATES PATENTS

| Re. 2,679 | 7/1967 | Brock | 209—138 |
|---|---|---|---|
| 696,870 | 4/1902 | Kessler | 302—62 X |
| 888,156 | 5/1908 | Gillette | 209 |
| 2,766,880 | 10/1956 | Schaub et al. | 209—138 |
| 2,878,508 | 3/1959 | Sedgwick et al. | 302—34 |
| 2,819,124 | 1/1958 | Bergstrom | 302—50 |

ANDRES H. NIELSEN, *Primary Examiner.*

U.S. Cl. X.R.

302—59